US007899873B2

(12) United States Patent
Jackson et al.

(10) Patent No.: US 7,899,873 B2
(45) Date of Patent: Mar. 1, 2011

(54) SYSTEM AND METHOD OF CONTROLLING A MESSAGING SYSTEM

(75) Inventors: James Jackson, Austin, TX (US);
Thomas Adams, Austin, TX (US);
Mehrad Yasrebi, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 233 days.

(21) Appl. No.: 12/123,996

(22) Filed: May 20, 2008

(65) Prior Publication Data

US 2009/0292777 A1 Nov. 26, 2009

(51) Int. Cl.
*G06F 15/16* (2006.01)
*G06F 15/173* (2006.01)

(52) U.S. Cl. .............. 709/206; 709/224; 709/225; 709/229; 709/245

(58) Field of Classification Search ............... 709/203, 709/206, 224, 225, 229, 245; 713/202, 170
See application file for complete search history.

(56) References Cited

U.S. PATENT DOCUMENTS

| | | | |
|---|---|---|---|
| 6,360,272 B1 | 3/2002 | Lincke et al. | |
| 7,158,525 B2 * | 1/2007 | Daffner et al. | 709/203 |
| 7,185,360 B1 * | 2/2007 | Anton et al. | 709/229 |
| 7,360,090 B1 * | 4/2008 | Doskow et al. | 713/170 |
| 7,426,576 B1 * | 9/2008 | Banga et al. | 709/245 |
| 2001/0040886 A1 | 11/2001 | Jimenez et al. | |
| 2001/0043592 A1 | 11/2001 | Jimenez et al. | |
| 2001/0048676 A1 | 12/2001 | Jimenez et al. | |
| 2002/0006124 A1 | 1/2002 | Jimenez et al. | |
| 2002/0024536 A1 | 2/2002 | Kahan et al. | |
| 2002/0124057 A1 | 9/2002 | Besprosvan | |
| 2002/0128036 A1 | 9/2002 | Yach et al. | |
| 2002/0131561 A1 | 9/2002 | Gifford et al. | |
| 2002/0174195 A1 | 11/2002 | Meyer et al. | |
| 2002/0194226 A1 | 12/2002 | Sheth | |
| 2002/0194502 A1 | 12/2002 | Sheth | |
| 2003/0055985 A1 | 3/2003 | Corb et al. | |
| 2003/0074411 A1 | 4/2003 | Nale | |
| 2003/0083882 A1 | 5/2003 | Schemers et al. | |
| 2003/0123622 A1 | 7/2003 | Gifford | |
| 2003/0149900 A1 * | 8/2003 | Glassman et al. | 713/202 |
| 2003/0152203 A1 | 8/2003 | Berger | |
| 2003/0172145 A1 | 9/2003 | Nguyen | |
| 2003/0231207 A1 | 12/2003 | Huang | |
| 2004/0030554 A1 | 2/2004 | Boxberger-Oberoi | |

(Continued)

OTHER PUBLICATIONS

"Voice Mail Message from," Midcontinent voicemail notification, May 12, 2008, 5 pages, Midcontinent.

*Primary Examiner*—Quang N. Nguyen
(74) *Attorney, Agent, or Firm*—Toler Law Group (57) ABSTRACT

Systems and methods of controlling a messaging system are provided. A particular method includes generating an n-times-use network address to access a control interface in response to receipt of a message addressed to a subscriber at a messaging system. The method further includes determining a notification address associated with the subscriber and generating a notification message addressed to the notification address. The notification message includes at least a portion of content of the message and the n-times-uses network address. The n-times-use network address is selectable a predetermined number of times at a browser application to send a control message to the control interface to control disposition of the message.

28 Claims, 5 Drawing Sheets

U.S. PATENT DOCUMENTS

| | | |
|---|---|---|
| 2004/0034723 A1 | 2/2004 | Giroti |
| 2004/0064351 A1 | 4/2004 | Mikurak |
| 2004/0122835 A1 | 6/2004 | McKibben et al. |
| 2004/0123242 A1 | 6/2004 | McKibben et al. |
| 2004/0267963 A1 | 12/2004 | Whynot |
| 2005/0048958 A1 | 3/2005 | Mousseau et al. |
| 2005/0288961 A1 | 12/2005 | Tabrizi |
| 2006/0129696 A1 | 6/2006 | Bagley et al. |
| 2006/0166650 A1 | 7/2006 | Berger et al. |
| 2006/0178918 A1 | 8/2006 | Mikurak |
| 2006/0291471 A1 | 12/2006 | Heuer et al. |
| 2007/0150480 A1 | 6/2007 | Hwang et al. |
| 2007/0180060 A1 | 8/2007 | Patel et al. |
| 2007/0242809 A1 | 10/2007 | Mousseau et al. |
| 2008/0045265 A1 | 2/2008 | Yach et al. |

* cited by examiner

SYSTEM AND METHOD OF CONTROLLING A MESSAGING SYSTEM

FIELD OF THE DISCLOSURE

The present disclosure is generally related to a system and method for controlling a messaging system.

BACKGROUND

Messaging systems receive and store messages for users. For example, voice mail systems receive and store voice messages, electronic mail systems receive and store e-mail messages, and so forth. Unified messaging systems integrate different streams of communication (e.g., electronic mail (email), short messaging service (SMS), fax, voice, video, or others) into a single or unified message store that may be accessible from a variety of different devices. While unified messaging systems can enable a user to receive and store messages of various types at a single message store, it can be inconvenient for users to access the unified messaging system to control disposition of their messages.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE DRAWINGS

Systems and methods of controlling a messaging system are disclosed. In a particular embodiment, a method includes generating an n-times-use network address to access a control interface in response to receipt of a message addressed to a subscriber at a message system. The method further includes determining a notification address associated with the subscriber and generating a notification message addressed to the notification address. The notification message includes at least a portion of content of the message and the n-times-use network address. The n-times-use network address is selectable a predetermined number of times at a browser application to initiate a control message to be sent to the control interface to control disposition of the message.

In another particular embodiment, a method includes receiving, at a control interface of a messaging system, a control command addressed to a network address of the control interface. The method further includes determining whether the network address has been accessed a predefined number of times and authenticating the control command based on an authentication token of the network address. The method also includes determining, based on the network address, a message of the messaging system to which the control command pertains, and sending a messaging system command to the messaging system when the network address has not been accessed the predefined number of times, to perform an action with respect to the message based on the control command.

In another particular embodiment, a system includes a messaging system interface to receive notification that a message addressed to a subscriber has been received at a messaging system. The system further includes an access server coupled to the messaging system interface. The access server generates a network address including an authentication token. The access server also determines a notification address of the subscriber and generates a notification message addressed to the notification address. The notification message includes the network address. The system also includes a control interface coupled to the access server. The control interface is adapted to receive a control message addressed to the network address. The control message includes a command to perform an action at the messaging system with respect to the message.

In a particular embodiment, a computer readable medium includes processor executable instructions that, when executed, cause the processor to authenticate a received control command addressed to a one-time-use network address. The one-time-use network address is associated with an authentication token. The computer readable medium also includes instructions that, when executed, cause the processor to determine, based on the one-time-use network address, a message of a messaging system to which the received control command pertains and to send a messaging system command to the messaging system to perform an action with respect to the message based on the control command.

In a particular embodiment, a message notification display is disclosed. The message notification display includes a graphical user interface including information notifying a user of a message received at a messaging system and at least one user selectable control option. Selection of the at least one user selectable control option causes a message disposition control command to be sent to a network address of the messaging system. The network address includes an authentication token to authenticate the control command to the messaging system to act on the control command.

Figure 1:
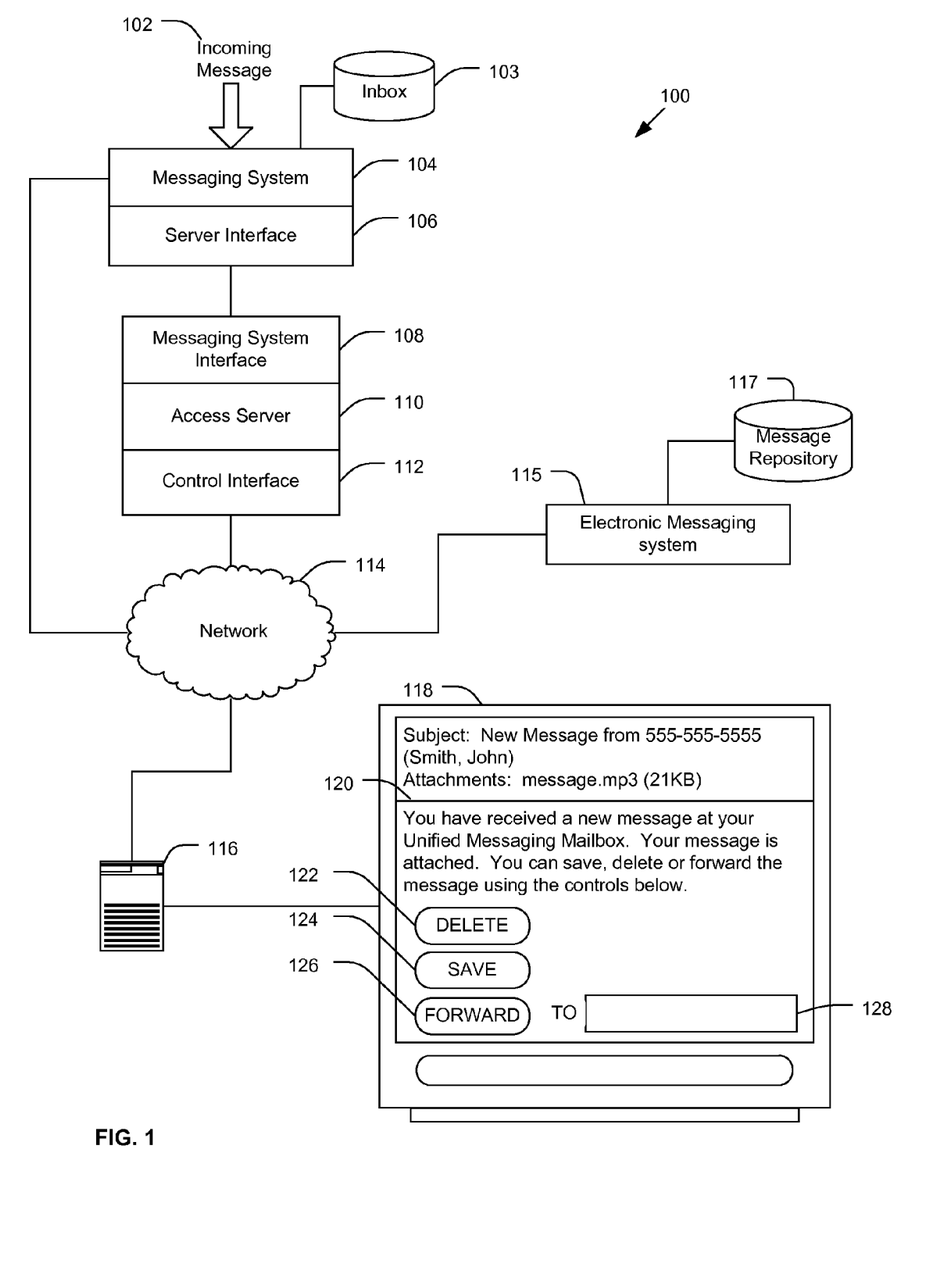
FIG. 1 is a diagram of an illustrative embodiment of a system to control a messaging system.

Referring to FIG. 1, a particular embodiment of a system to control a messaging system is illustrated and is generally designated 100. The system 100 includes a messaging system 104 adapted to receive an incoming message 102 and to store the incoming message 102 at a messaging system inbox 103. The messaging system 104 is coupled to a server interface 106. The messaging system 104 communicates via the server interface 106 with an access server 110. The server interface 106 may include any computer-to-computer interface implemented in hardware, software, or any combination thereof. For example, the server interface 106 may be a web services interface, a common object request broker architecture (CORBA) interface, a remote method invocation (RMI) interface, a Short Messaging Service (SMS) interface, or another computer-to-computer interface. The access server 110 includes a messaging system interface 108 and a control interface 112. The messaging system 104 and the access server 110 are both adapted to communicate via a network 114 with an electronic messaging system 115. The electronic messaging system 115 is adapted to store electronic messages addressed to a subscriber at a message repository 117. The electronic messaging system 115 is also adapted to provide the electronic messages to one or more user devices, such as a user computer 116, via a graphical user interface display at a display device 118.

In a particular embodiment, the messaging system 104 is a unified messaging system, adapted to receive a variety of communication input messages for one or more subscribers. For example, the messaging system 104 may be adapted to receive facsimile transmissions, electronic mail ("email"), voice mail messages, other voice or data messages, or any combination thereof. Messages received at the messaging system 104 can be stored at the messaging system inbox 103 in any format. For example, facsimile transmissions can be stored in a tiff format, a portable document format (pdf), a text format, or another image or data format. In another example, voice mail messages can be stored in an audio data format, such as a Motion Picture Expert Group-1 Audio Layer 3 (MP3) format, a Windows Media Audio (WMA) format, a g.711 format, or any other compressed or uncompressed audio data format. The messaging system 104 may send notification of a newly received message via the network 114 to a network address associated with a particular subscriber to which the message was addressed. For example, as depicted in FIG. 1, the notification network address may be associated with a messaging account at the electronic messaging system 115 that is associated with the messaging system 104 subscriber. The electronic messaging system 115 and the messaging system 104 may be independent of one another. For example, the messaging system 104 and the electronic messaging system 115 may be owned or operated by separate entities. In a particular embodiment, the electronic messaging system 115 may include any system capable of receiving a message for a user and generating a display for presentation to the user that includes at least a portion of the content of the received message. Example electronic messaging systems include, but are not limited to, the Google Mail™ service available from Google Inc., and the Yahoo! Mail™ service available from Yahoo! Inc. The electronic messaging system may also include a SMS messaging system.

In a particular embodiment, the access server 110 is adapted to receive notification from the messaging system 104 that a new incoming message 102 addressed to the subscriber has been received at the messaging system 104, via the messaging system interface 108. In response to the notification that the incoming message 102 has been received, the access server 110 may prepare a notification message to be sent to the subscriber. In a particular illustrative embodiment, the access server 110 determines a notification address of the subscriber. The notification address may be specified by an administrator of the messaging system 104 or access server 110, or may be received from the subscriber. In a particular illustrative embodiment, the notification address is an email address associated with the electronic messaging system 115. The notification address specifies where a notification message indicating that a new message has been received is to be sent.

The access server 110 may also determine whether the subscriber is associated with a subscriber group. For example, the subscriber may be associated with an enterprise business subscriber group or with one or more other subscribers associated with a group subscription (e.g., a family subscription) to the messaging system 104. When the subscriber is associated with a subscriber group, the access server 110 may add a subscriber group template to the notification message. The subscriber group template may include a form, graphics, or other information sent with notification messages to subscribers associated with the subscriber group. For example, a particular business entity associated with a group subscription may desire to place a company logo in each message sent to a subscriber associated with the company subscription. In another example, a business subscriber may desire to place a confidentiality notice or other notice in each notification message to a subscriber associated with the business subscription.

In a particular embodiment, the access server 110 is adapted to modify the incoming message 102 in accordance with specified criteria. For example, the access server 110 may transcode at least a portion of the incoming message 102 into a predetermined notification format. For example, where the incoming message 102 includes a voice mail, the access server 110 may transcode the voice mail from a format in which the voice mail is stored at the messaging system inbox 103 into a format more suited for playback via the user computer 116, such as the MP3 format. In generating the notification message, the access server 110 may attach at least the transcoded portion of the incoming message 102 to the notification message.

In a particular embodiment, the access server 110 also generates a network address associated with the incoming message 102. The network address may be associated with the incoming message 102 such that accessing the network address, via the user computer 116 for example, enables access by the user at user computer 116 via the access server 110 to the incoming message 102 at the messaging system inbox 103 to control disposition of the message. In a particular embodiment, the network address includes an authentication token. The access server 110 may check the authentication token when a control message is received from the user computer 116 to determine whether to send a control command to the messaging system 104 in response to the control message. The authentication token may include a set of random or pseudo-random symbols that is uniquely associated the message with the notification message. The number of symbols that make up the network address or the authentication token can be selected so as to reduce the likelihood of accidental disclosure of a valid network address. In an illustrative embodiment, the number of symbols that make up the network address or the authentication token can be selected so as to reduce the likelihood of an unauthorized party generating a valid network address or authentication token using an automated process (e.g., a so-called "brute force attack"). The access server 110 may include the network address in the notification message sent to the subscriber.

In a particular embodiment, the network address is operable a predetermined or predefined number of times. For example, the network address may be a one-time-use network address. The access server 110 may invalidate the network address after receiving the predetermined number of accesses to the network address. In another particular embodiment, the network address is time-limited. That is, the access server 110 sets an expiration time period associated with the network address. After the expiration time period had passed, the access server 110 invalidates the network address such that control commands received at the access server 110 that are addressed to the network address are not acted upon.

The control interface 112 of the access server 110 may be adapted to receive control messages addressed to the network address via the network 114. When a control message is received, the control interface 112 or the access server 110 may determine whether the network address to which a control message is addressed is valid, has not been activated before and has not expired. The access server 110 may then generate a control command to the messaging system 104 based on the control message to control disposition of the message at the messaging system inbox 103. In a particular embodiment, the authentication token is used to authenticate the control message such that further identification or authentication credentials are not required of the subscriber before the control command is sent to the messaging system 104.

In operation, the incoming message 102 is received at the messaging system 104 via one or more communication channels, such as a facsimile transmission line, an electronic mail messaging line, a short messaging service interface, a telephone interface, a video communication line or any other unified messaging system communication interface. In response to receiving the incoming message 102, the messaging system 104 may send a notification via the server interface 106 to the messaging system interface 108 of the access server 110. Additionally, the messaging system 104 stores the incoming message 102 at the messaging system inbox 103.

In a particular embodiment, the access server 110 generates a notification message including information about the incoming message 102. For example, the notification message may include: information about the sender of the incoming message 102; all of or a portion of the incoming message 102 in a format specified by the subscriber for notifications; one or more control options to control disposition of the incoming message 102 at the messaging system 104; a network address associated with the incoming message 102; an authentication token; other information as specified by the subscriber or administrator of the messaging system 104 of the access server 110 (such as a group message template); or any combination thereof. In a particular illustrative embodiment, the notification message is an email message. The email message may be addressed to the notification address. For example, the email message may be addressed to an email address of the subscriber at the electronic messaging system 115. In another particular illustrative embodiment, the notification message is an SMS message. The SMS message may be addressed to an SMS address of the subscriber at the electronic messaging system 115. The access server 110 may select the notification address based on subscriber account information associated with the messaging system subscriber.

In a particular embodiment, the access server 110, after preparing the notification message, sends the notification message via the messaging system interface 108 and the server interface 106 to the messaging system 104. The messaging system 104 may send the notification message via the network 114 to the notification address. In another particular embodiment, the access server 110 sends the notification message to the notification address, bypassing the messaging system 104.

The notification message may be received by the electronic messaging system 115 and stored in the message repository 117. The subscriber may access the electronic messaging system 115 to display the notification message at the display device 118 in a message notification display 120. For example, when the electronic messaging system 115 includes a web-based email browser interface, the user may access a network address associated with the electronic messaging system 115 using a browser application. The message notification display 120 includes several selectable control options adapted to cause the browser application to generate control commands. For example, the message notification display 120 includes a delete option 122, a save option 124, a forward option 126, and a forwarding address input area 128. In another particular embodiment, the notification message may be sent via a Short Messaging Service (SMS) message and the electronic messaging system 115 may include an SMS message repository, the email system inbox, or any combination thereof.

The subscriber may interact with the message notification display 120 to send one or more control messages to the messaging system 104. For example, the notification message may be displayed by the electronic messaging system 115 via the browser application at display device 118. The user may select a selectable control option, such as the delete option 122, the save option 124, or the forward option 126, to generate a corresponding control command to control disposition of the incoming message 102 at the messaging system 104. When the user selects one of the selectable control options 122-126, the browser application may generate a control message including information about the selected control option and including the network address generated by the access system 110. For example, the control message may be addressed to the network address that includes the authentication token generated by the access system 110. The browser application may send the control message to the network address. For example, the control message may include a hyper text transfer protocol (HTTP) GET or SUBMIT request directed to the network address. In other examples, the control message may include other HTTP requests, file transfer protocol (FTP) requests, Transmission Control Protocol (TCP) messages, Internet Protocol (IP) messages, or any combination thereof.

The control interface 112 may receive the control message and pass the control message or an indication that the control message was received to the access server 110. The access server 110 may verify that the authentication token is correct and may determine that the network address has not expired, has not been activated before and is valid. Additionally, the access server 110 may store a record that invalidates the one-time-use network address after receiving the control message. The access server 110 may also determine an address associated with the source of the control message (such as an Internet Protocol address or other network address of the user computer 116). For example, the access server 110 may perform a reverse domain name service (DNS) lookup with respect to the control message to determine a source address of the source of the control message. The access server 110 may determine whether the source of the control message is authorized to issue commands with respect to the messaging system 104 based on the source address. For example, the access server 110 may determine whether the source address is included in a list of blocked source addresses.

When the control message is from an authorized source (e.g., a source that is not blocked), when the network address has not been activated before, and when the network address has not expired and is valid, the access server 110 may generate a control command to the messaging system 104 to perform a particular action with respect to the incoming message 102. When the access server 110 determines, based on the control message, that the delete option 122 has been selected, the control command may instruct the messaging system 104 to delete the incoming message 102 from the messaging system inbox 103. When the access server 110 determines, based on the control message, that the forward option 126 was selected and a forwarding address (such as a telephone number) is specified in the control message (e.g., via forwarding address input area 128), the control command may instruct the messaging system 104 to forward the message to the specified forwarding address. When the access server 110 determines, based on the control message, that the save option 124 has been selected, the control command may instruct the messaging system 104 to save the incoming message 102 at a default folder associated with the messaging system inbox 103. In a particular embodiment, the save option 124 may enable the user to select a folder from a list of available folders in which to save the message. Additionally, after receiving the control command the messaging system may indicate that the incoming message 102 has been accessed by the subscriber. For example, the message may be marked as an old message.

In a particular embodiment, the access server 110 prepares a confirmation message addressed to the subscriber notification address after sending the control command. The confirmation message may indicate to the subscriber that a particular action was performed with respect to the incoming message 102 at the messaging system 104. In a particular illustrative embodiment, the access server 110 may await confirmation from the messaging system 104 that the action was performed before sending the confirmation message.

In a particular embodiment, communications between the electronic messaging system 115, the messaging system 104 and the access server 110 can be either encrypted so that their contents are not visible to third parties or digitally signed so that they can be validated as having originated from the access server 110 or a particular user of the electronic messaging system 115. The encryption keys to encrypt or digitally sign the communications may be stored at the messaging system 104, the electronic messaging system 115, or both, prior to the reception of the incoming message 102. For example, all of or portions of the notification message, the confirmation message, the control message, the network address, the authentication token, or any combination thereof may be encrypted using public key encryption. In a particular illustrative embodiment, S/MIME (Secure/Multipurpose Internet Mail Extensions) based encryption using a public key stored in certificates at both the messaging system 104 and the electronic messaging system 115 is used.

Figure 2:
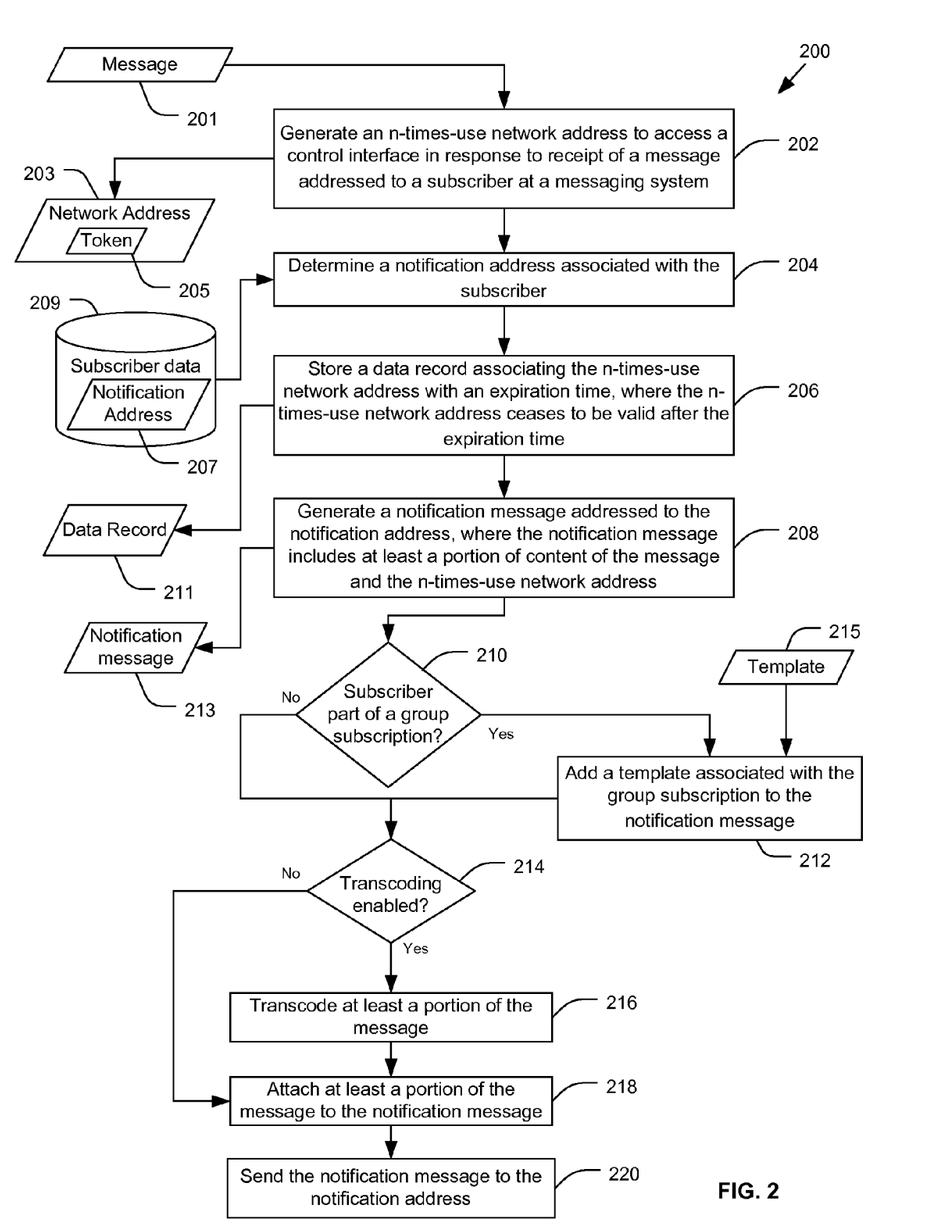
FIG. 2 is a flow chart of a first embodiment of a method of controlling a messaging system.

Referring to FIG. 2, a first particular embodiment of a method of controlling a messaging system is illustrated and is generally designated 200. The method 200 includes, at 202, generating a one-time-use network address 203 to access a control interface in response to receipt of a message 201 addressed to a subscriber at a messaging system. In a particular embodiment, the one-time-use network address 203 includes an authentication token 205 (e.g., a set of random or pseudo-random numbers uniquely associated with the message). The one-time-use network address 203 is selectable at a browser application to initiate a control message to be sent to the control interface. The control message may control disposition of the message at a messaging system. To illustrate, the one-time-use network address 203 may be embedded in a HTML form. The HTML form may be adapted to cause the browser application to send a GET or SUBMIT request to the one-time use network address 203 and the authentication token 205. The GET or SUBMIT request may include information that indicates to the control interface the particular action to be taken. The authentication token 205 may be used by the control interface to determine whether the GET or SUBMIT request (including a control command) received at the one-time-use network address 203 is valid.

The method 200 also includes, at 204, determining a notification address 207 associated with the subscriber. In a particular embodiment, the notification address 207 may be specified by the subscriber or an administrator of the messaging system and retained in a subscriber database 209. The notification address 207 may comply with predetermined notification address criteria established by an administrator of the messaging system. The notification address criteria may specify that notifications may be sent only to network addresses associated with one or more particular domains, or the notification address criteria may specify that notification messages may not be sent to network addresses associated with one or more particular domains. For example, the messaging system administrator of a business may establish notification address criteria that only allow notification messages to be sent to a domain associated with the business, such as a business email address associated with the business.

In a particular embodiment, the method 200 includes, at 206, storing a data record 211 associating the one-time-use network address 207 with an expiration time. The one-time-use network address 207 may cease to be valid after the expiration time. The method 200 also includes, at 208, generating a notification message 213 addressed to the notification address 207. The notification message 213 may include at least a portion of content of the message 201 and the one-time-use network address 203.

In a particular embodiment, the method 200 includes, at 210, determining whether the subscriber is part of a group subscription. For example, the subscriber may be part of an enterprise subscription of a business. When the subscriber is part of a group subscription, the method 200 may include, at 212, adding a template 215 associated with the group subscription to the notification message 213.

In a particular embodiment, the method includes, at 214, determining whether transcoding is enabled for the particular subscriber or subscriber group. When transcoding is not enabled, the method proceeds to 218, or in an alternate embodiment (not shown) to 220. When transcoding is enabled, the method includes, at 216, transcoding at least a portion of the message 201. For example, the message 201 or a portion of the message 201 may be converted to a format specified by the subscriber. The format to which the message 201 is converted may be selected to be more readily presented via a computer system than a format in which the message is stored at the messaging system. For example, when the message is a voice mail message, it may be converted into an MP3, wav, or another compressed or uncompressed audio format that is readily playable via the subscribers' computer system. In another example, when the message is a facsimile, it may be converted to a tiff, a portable document format (pdf), a text format, or another image or data format. The method 200 also includes, at 218, attaching at least a portion of the message to the notification message 213, and, at 220, sending the notification message 213 to the notification address 207.

Figure 3:
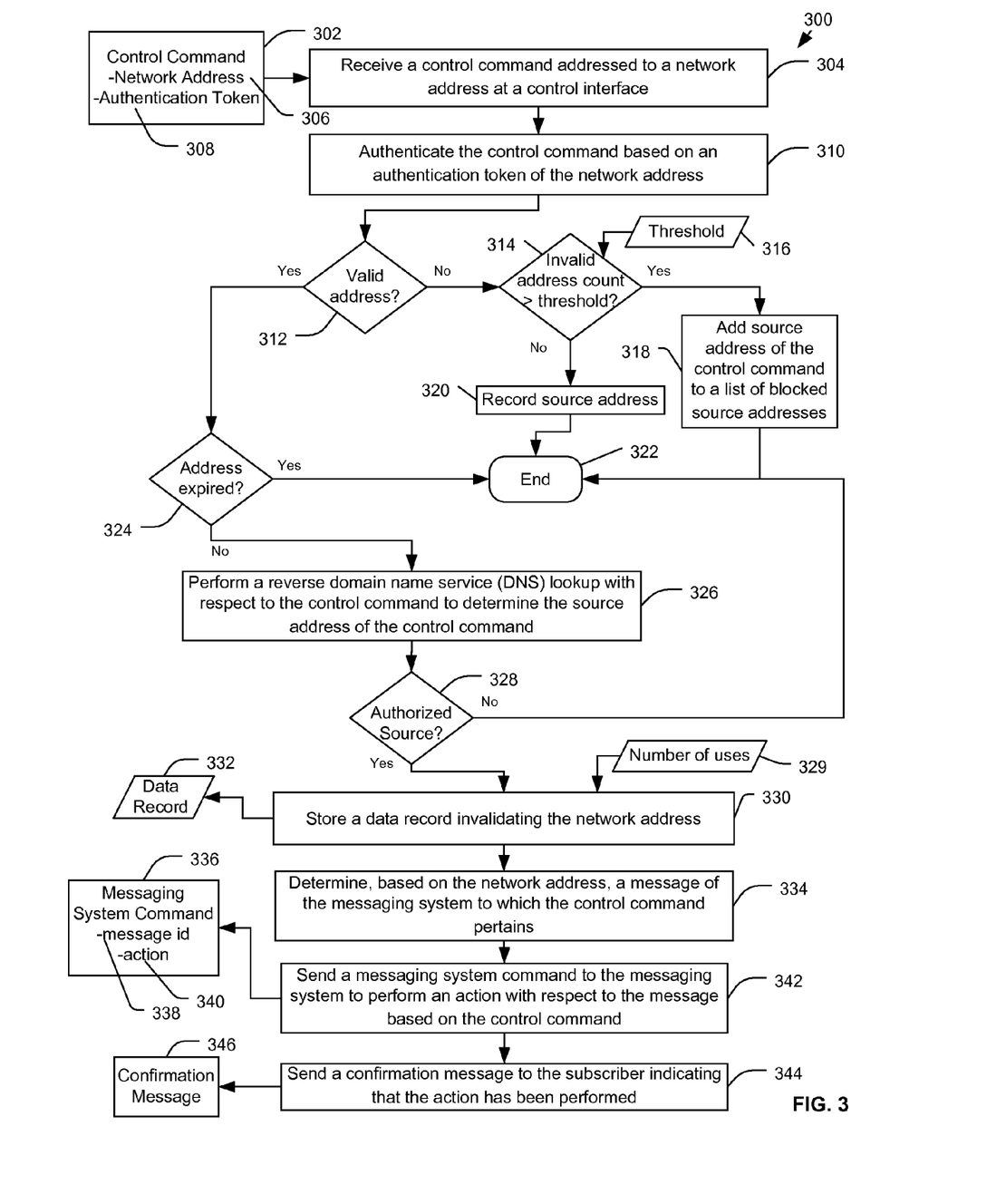
FIG. 3 is a flow chart of a second embodiment of a method of controlling a messaging system.

FIG. 3 depicts a second particular embodiment of a method of controlling a messaging system, generally designated 300. The method 300 includes, at 304, receiving a control command 302 addressed to a one-time-use network address 306 at a control interface. The control command 302 may include a variety of commands adapted to control disposition of a message at a messaging system. For example, the control command 302 may include a command to delete, forward, save, or otherwise dispose of the message at the messaging system. In a particular embodiment, the network address 306 may be an "n"-times use network address, where the network address 306 is accessible a predetermined number of times, n, where n is greater than one.

In a particular embodiment, the method 300 includes, at 310, authenticating the control command 302 based on an authentication token 308 of the one-time-use network address 306. For example, the authentication token 308 may include a random or pseudo-random set of characters that are associated with the message at the messaging system. The authentication token 308 may be used to authenticate that the control command 302 received at the one-time-use network address 306 is valid and that the control command 302 originates from a notification message sent to a subscriber of the messaging system. In another embodiment, the user may be challenged to provide additional authentication information, such as a password or other access credentials as an additional security measure.

In a particular embodiment, the method 300 also includes, determining, at 312, whether the network address 306 is a valid address. When the network address 306 of the control command 302 is not valid, this can be an indication that someone is attempting to gain unauthorized access to the messaging system. For example, a hacker may be attempting to guess a valid authentication token to dispose of a message related to the authentication token or as part of a denial of service attack on the messaging system. Such an attempt is unlikely to succeed on the first try because the authentication token is of sufficient length that guessing a valid authentication token in a single attempt is highly unlikely. To increase the likelihood of success, a hacker may initiate an automated process to guess a large number of authentication tokens over a period of time. To reduce the risk of a this type of attack being successful, when a threshold number of control commands are received that include invalid authentication tokens, the source address of the control commands can be blocked.

In a particular illustrative embodiment, the network address is valid and operable only a predetermined number of times. For example, the network address may be a one-time-use network address that is valid and operable only a single time. In another example, the network address may be operable more than one time. In this embodiment, determining whether the network address is valid, at 312, can also include determining whether the network address is associated with a data record indicating that the network address has been accessed the predetermined number of times, and is therefore invalid or inoperable.

In a particular illustrative embodiment, the source address may be blocked after a threshold number of invalid authentication tokens have been received from the source address. For example, when the network address 306 is not a valid address, the method 300 includes, at 314, determining whether a threshold 316 number of attempts to access the invalid address have been received from a source address of the control command 302. When a count of the number of attempts to access invalid addresses is greater than the threshold 316, the method proceeds to 318 and adds the source address of the control command 302 to a list of blocked source addresses. When a count of the number of attempts to access invalid addresses is not greater than the threshold 316, the method proceeds to 320 and records the source address of the control command 302 to maintain a count of the number of attempts to access invalid addresses that are received from the source address. The method then terminates at 322. In an illustrative embodiment, a reverse domain name service (DNS) lookup may be performed to determine the source address of the control command 302.

Returning to 312, when the network address 306 is valid, the method 300 includes, at 324, determining whether the network address 306 is expired. When the network address 306 is expired, the method 300 terminates at 322. That is, the control command 302 is not acted upon. Additionally, a confirmation message may be sent to a subscriber notification address associated with the message to inform the subscriber that the action requested in the control command 302 was not performed.

When the network address 306 is not expired at 324, the method 300 includes determining, at 328, whether the source address of the control command 302 is authorized to control disposition of the message. For example, the method 300 may include, at 326, performing a reverse domain name service (DNS) lookup with respect to the control command 302 to determine the source address of the control command 302. When the source address is not authorized, the method 300 terminates at 322.

When the source address is authorized, the method 300 includes, at 330, storing a data record 332 that invalidates the network address when the network address has been accessed the predetermined number, n, of times 329. When the network address has been accessed n times, the method may store the data record 332 to invalidated the network address. When the network address has not been accessed n times, the method 300 updates a count of the number of times the network address has been accessed and proceeds to 334.

The method also includes, at 334, determining, based on the network address 306, a message of the messaging system to which the control command 301 pertains and, at 342, sending a messaging system command 336 to the messaging system to perform an action 340 with respect to the message based on the control command 302. For example, when the control command 302 includes a delete command an action 340 may include deleting a message identified by a message identifier 338. The messaging system command 336 may instruct the messaging system to delete the message identified by the message identifier 338 from a messaging system message store. When the control command 302 includes a save command, the action 340 may include saving the message at the messaging system message store, and the messaging system command 336 may instruct the messaging system to save the message associated with the message identifier 338 at the messaging system message store. In a particular embodiment, the save command may include a selection of a particular folder of the messaging system message store in which the message is to be stored, and the messaging system command 336 may instruct the messaging system to save the message in the particular folder. When the control command 302 includes a forward command, the action 340 may include forwarding the message to a forwarding address specified in the control command 302, and the messaging system command 336 may instruct the messaging system to forward the message associated with the message identifier 338 to the forwarding address specified in the control command 302. In an illustrative embodiment, the forwarding address may include a telephone number to which the message is to be forwarded.

In a particular embodiment, the method 300 includes, at 344, sending a confirmation message 346 to the subscriber indicating that the action 340 has been performed with respect to the message. For example, the confirmation message 346 may be sent to a notification address associated with the subscriber. In a particular embodiment, the message may have been modified at the messaging system via another control interface between the time that a notification of receipt of the message was sent to the subscriber and when the control command 302 was received. For example, after the notification message was sent, the subscriber may have called the messaging system and saved, deleted, marked read, or forwarded the message. In this situation, the confirmation message 346 may indicate that an action has already been taken with respect to the message via the other interface to the messaging system. For example, the confirmation message may indicate that the message has already been saved, deleted, read, or forwarded.

Figure 4:
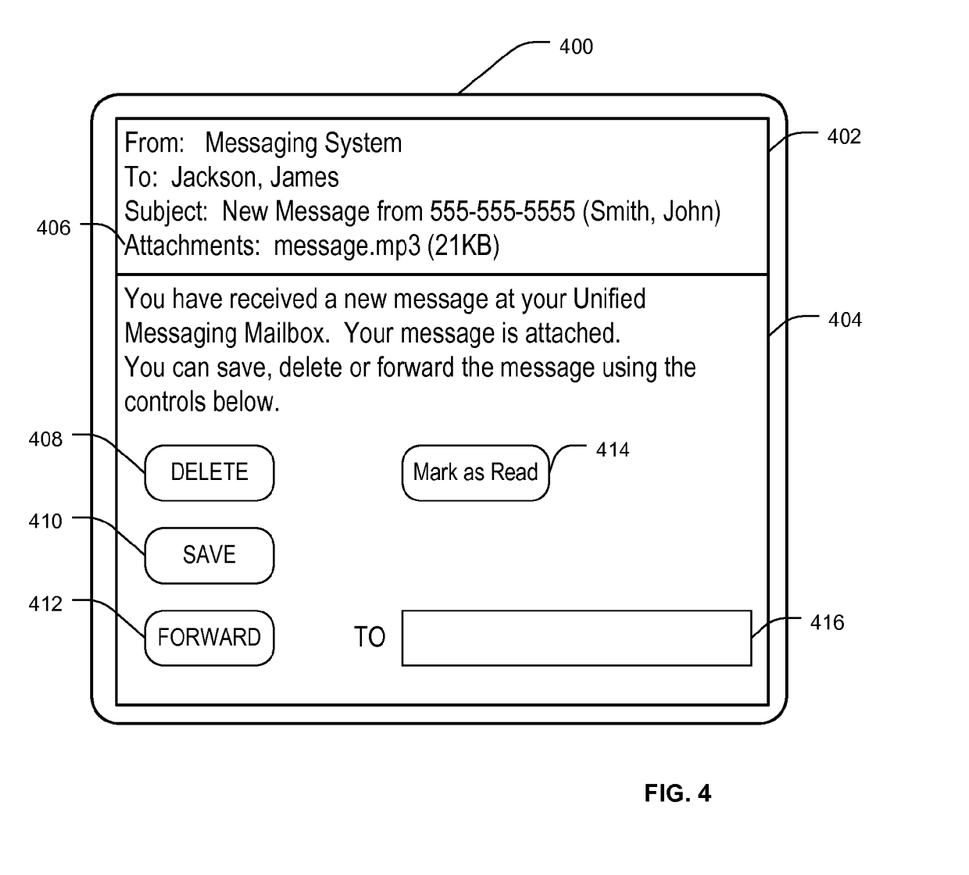
FIG. 4 is a diagram of an embodiment of a graphical user interface for controlling a messaging system.

FIG. 4 depicts a particular embodiment of a graphical user interface for controlling a messaging system. The graphical user interface includes notification information notifying a user of a message received at a messaging system. For example, the graphical user interface display includes a message notification display 400. The message notification display 400 includes a header 402, and a body 404. The header 402 includes information indicating to the user that a new message has been received at the messaging system. The header 402 may also include information indicating a type of message (e.g., voice mail, email, facsimile, short messaging service, etc.), a party from which the message was received, a time and date when the message was received, other information about the message, a sender or messaging system, or any combination thereof. In a particular embodiment, the header 402 may also include information indicating that at least a portion of the message is attached with the notification message. For example, the header may include an indication of an attachment 406 including at least a portion of the message.

The body 404 of the message notification display 400 may include information about the message and information about messaging controls that are available to the user via the notification message. In a particular embodiment, the message notification display 400 includes at least one selectable control option, such as a delete option 408, a save option 410, a forward option 412, and a mark as read option 414. The selectable control options 408-414 may be adapted to cause a control message to be sent to a network address of the messaging system. The network address may include an authentication token that authenticates the control message to the messaging system such that the messaging system takes an action with respect to the message in response to the control message.

For example, selecting the delete option 408 in the message notification display 400 may cause a control message to be sent to the messaging system. The control message may indicate to the messaging system that a particular message is to be deleted. Additionally, the control message may include the authentication token embedded in the network address to which the control message is sent. The authentication token may be used by the messaging system to identify the message as well as to authenticate that the control message is valid. As such, the user is not required to log in to the messaging system (e.g., by providing other authentication credentials such as a user name and password) to control disposition of the message.

In another example, selecting the save option 410 may cause a control message to be sent to the messaging system at the network address. The control message may indicate to the messaging system to save the message at a messaging system message store. Additionally, the control message may include the authentication token so that the messaging system can verify that the control message is valid and identify the message. In a particular embodiment, the save option 410 may be associated with a list of selectable folders to designate a particular folder in which the message should be saved.

In another example, selecting the mark as read option 414 may cause a control message to be sent to the messaging system at the network address. The control message may indicate to the messaging system to mark the message as read at a messaging system message store. Additionally, the control message may include the authentication token so that the messaging system can verify that the control message is valid and can identify the message.

In a particular embodiment, the forward option 412 is associated with a forwarding address input area 416. In this embodiment, the user can input a forwarding address at the forwarding address input area 416 and select the forward option 412 to generate a forwarding control message to the messaging system. The forwarding address provided at forwarding address input area 416 may be included in the forward control message. In an illustrative embodiment, the forwarding address can include a telephone number to which the message is to be forwarded. The forward control message can include the authentication token. The messaging system may authenticate the control command via the authentication token and may forward the message to the forwarding address based on the forward control message.

Figure 5:
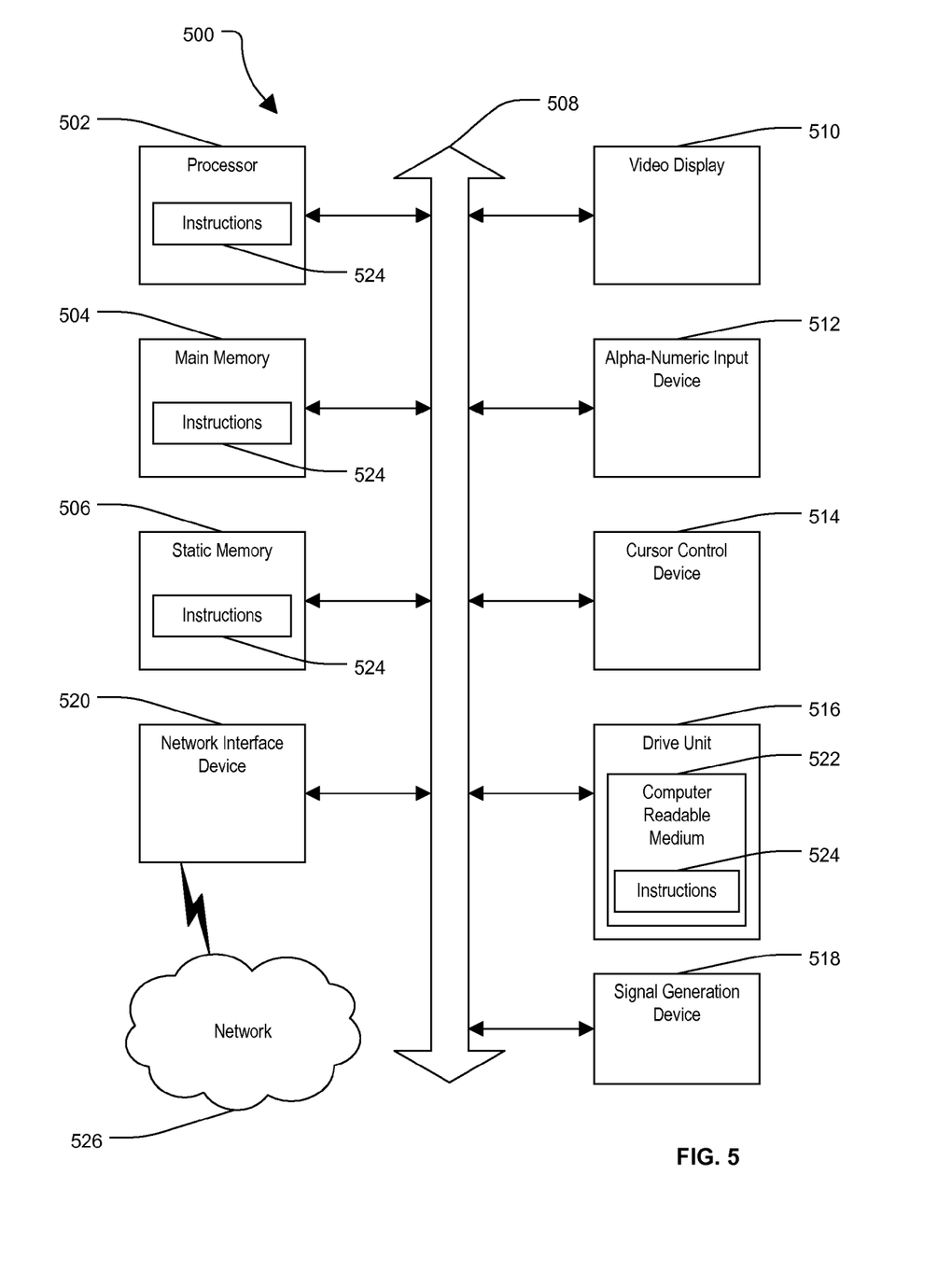
FIG. 5 is a diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 can include or be included within any one or more of the messaging systems, access servers, electronic messaging systems, or user computers illustrated in FIG. 1.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods or systems described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a control interface of a messaging system, a control command addressed to a network address of the control interface;
determining whether the network address is valid after receiving the control command;
adding a source address of the control command to a list of blocked source addresses after a threshold number of invalid control commands have been received from the source address;
determining whether the network address has been accessed a predefined number of times;
storing a data record invalidating the network address when the network address has been accessed the predefined number of times;
authenticating the control command based on an authentication token of the network address;
determining, based on the network address, a message of the messaging system to which the control command pertains;
determining whether an expiration time of the network address has passed; and sending a messaging system command to the messaging system when the network address has not been accessed the predefined number of times to perform an action with respect to the message based on the control command.

2. The method of claim 1, further comprising sending a confirmation message to a subscriber of a messaging service supported by the messaging system, the confirmation message indicating that the action has been performed.

3. The method of claim 1, further comprising determining whether a source address of the control command is authorized to control the messaging system before sending the messaging system command.

4. The method of claim 3, further comprising performing a reverse domain name service (DNS) lookup with respect to the control command to determine the source address.

5. The method of claim 1, wherein the action comprises forwarding the message to an address specified in the control command.

6. The method of claim 1, wherein the action comprises a delete action.

7. The method of claim 1, wherein the action comprises a save action to save the message at the messaging system.

8. The method of claim 7, wherein the control command specifies a folder at which the message is to be saved.

9. The method of claim 1, wherein the action comprises a mark as read action.

10. The method of claim 1, wherein the messaging system comprises a unified messaging system.

11. A non-transitory computer-readable medium, comprising:
instructions that, when executed by a processor, cause the processor to authenticate a control command addressed to a one-time-use network address of a control interface of a messaging system, wherein the one-time-use network address is associated with an authentication token;
instructions that, when executed by the processor, cause the processor to determine whether the one-time-use network address is valid after receiving the control command;
instructions that, when executed by the processor, cause the processor to add a source address of the control command to a list of blocked source addresses after a threshold number of invalid control commands have been received from the source address;
instructions that, when executed by the processor, cause the processor to determine whether the one-time-use network address has been previously accessed;
instructions that, when executed by the processor, cause the processor to store a data record invalidating the one-time-use network address when the one-time-use network address has been previously accessed;
instructions that, when executed by the processor, cause the processor to determine, based on the one-time-use network address, a message of the messaging system to which the control command pertains;
instructions that, when executed by the processor, cause the processor to determine whether an expiration time of the one-time-use network address has passed; and
instructions that, when executed by the processor, cause the processor to send a messaging system command to the messaging system when the one-time-use network address has not been previously accessed to perform an action with respect to the message based on the control command.

12. The non-transitory computer-readable medium of claim 11, further comprising instructions that, when executed by the processor, cause the processor to send a confirmation message to a subscriber of a messaging service supported by the messaging system, the confirmation message indicating that the action has been performed.

13. The non-transitory computer-readable medium of claim 11, further comprising instructions that, when executed by the processor, cause the processor to determine whether a source address of the control command is authorized to control the messaging system before sending the messaging system command.

14. The non-transitory computer-readable medium of claim 13, further comprising instructions that, when executed by the processor, cause the processor to perform a reverse domain name service (DNS) lookup with respect to the control command to determine the source address.

15. The non-transitory computer-readable medium of claim 11, wherein the action comprises forwarding the message to an address specified in the control command.

16. The non-transitory computer-readable medium of claim 11, wherein the action comprises a delete action.

17. The non-transitory computer-readable medium of claim 11, wherein the action comprises a save action to save the message at the messaging system.

18. The non-transitory computer-readable medium of claim 17, wherein the control command specifies a folder at which the message is to be saved.

19. The non-transitory computer-readable medium of claim 11, wherein the action comprises a mark as read action.

20. The non-transitory computer-readable medium of claim 11, wherein the messaging system comprises a unified messaging system.

21. A messaging system, comprising:
a control interface to receive a control command addressed to a network address of the control interface;
a processor; and
a non-transitory computer-readable medium comprising instructions that, when executed by the processor, cause the processor to:
determine whether the network address is valid after receiving the control command;
add a source address of the control command to a list of blocked source addresses after a threshold number of invalid control commands have been received from the source address;
determine whether the network address has been accessed a predefined number of times;
store a data record invalidating the network address when the network address has been accessed the predefined number of times;
authenticate the control command based on an authentication token of the network address;
determine, based on the network address, a message of the messaging system to which the control command pertains;
determine whether an expiration time of the network address has passed; and
send a messaging system command when the network address has not been accessed the predefined number of times to perform an action with respect to the message based on the control command.

22. The messaging system of claim 21, wherein the non-transitory computer-readable medium further comprises instructions that, when executed by the processor, cause the processor to send a confirmation message to a subscriber of a messaging service supported by the messaging system, the confirmation message indicating that the action has been performed.

23. The messaging system of claim 21, wherein the non-transitory computer-readable medium further comprises instructions that, when executed by the processor, cause the processor to determine whether a source address of the control command is authorized to control the messaging system before sending the messaging system command.

24. The messaging system of claim 23, wherein the non-transitory computer-readable medium further comprises instructions that, when executed by the processor, cause the processor to perform a reverse domain name service (DNS) lookup with respect to the control command to determine the source address.

25. The messaging system of claim 21, wherein the action comprises one of forwarding the message to an address specified in the control command, a delete action, and a mark as read action.

26. The messaging system of claim 21, wherein the action comprises a save action to save the message at the messaging system.

27. The messaging system of claim 26, wherein the control command specifies a folder at which the message is to be saved.

28. The messaging system of claim 21, wherein the messaging system comprises a unified messaging system.

* * * * *